(12) United States Patent
Bechtold et al.

(10) Patent No.: US 7,703,026 B2
(45) Date of Patent: Apr. 20, 2010

(54) NON-PATTERN BASED USER INTERFACE IN PATTERN BASED ENVIRONMENT

(75) Inventors: Johannes Bechtold, Mülhausen (DE); Andrea Langlotz, Mannheim (DE); Horst Schaude, Kraichtal (DE); Daniel Braxton, Plankstadt (DE)

(73) Assignee: SAP AG, Walldorf (DE)

( * ) Notice: Subject to any disclaimer, the term of this patent is extended or adjusted under 35 U.S.C. 154(b) by 810 days.

(21) Appl. No.: 10/825,652

(22) Filed: Apr. 16, 2004

(65) Prior Publication Data

US 2005/0234840 A1 Oct. 20, 2005

(51) Int. Cl.
G06F 3/00 (2006.01)
(52) U.S. Cl. ...................................... 715/762
(58) Field of Classification Search ............ 715/762, 715/763, 764, 751
See application file for complete search history.

(56) References Cited

U.S. PATENT DOCUMENTS

| | | | |
|---|---|---|---|
| 6,195,094 B1* | 2/2001 | Celebiler .................... | 715/764 |
| 6,275,223 B1* | 8/2001 | Hughes ...................... | 715/751 |
| 6,584,479 B2* | 6/2003 | Chang et al. ................ | 715/205 |
| 7,334,216 B2* | 2/2008 | Molina-Moreno et al. .. | 717/109 |
| 7,490,292 B2* | 2/2009 | Hennum ..................... | 715/714 |

OTHER PUBLICATIONS

Asa Granlund et al., "A Pattern-Supported Approach to the User Interface Design Process," Proceedings of HCI International 2001 9th International Conference on Human-Computer Interaction, Aug. 5-10, 2001, New Orleans, USA, pp. 1-5.
Martin Van Welie et al., "Pattern Languages in Interaction Design: Structure and Organization," Vrije Universiteit, Faculty of Sciences, Department of Computer Science, published at Interact 2003, 8 pages.
Jenifer Tidwell, "A Pattern Language for Human-Computer Interface Design," The Case for HCI Design Patterns, accessed on Mar. 30, 2005 from http://www.mit.edu/~jtidwell/common_ground_onefile.htm, 58 pages.
Summons mailed Feb. 26, 2009, issued by the European Patent Office in European Patent Application 04 009 096.1-2211 (7 pages).
Molina et al., "Just-UI: A User Interface Specification Model," Proceedings of Computer Aided Design of User Interfaces, CADUI 2002, May 2002, pp. 1-12, XP007907206 Les Valenciens, France.

* cited by examiner

*Primary Examiner*—Thanh T Vu
(74) *Attorney, Agent, or Firm*—Finnegan, Henderson, Farabow, Garrett & Dunner, LLP (57) ABSTRACT

Computer-implemented methods, systems, displays, and computer program products are provided for displaying data within a pattern based user interface. To allow flexibility when displaying data, the data may be displayed within a non-pattern based user interface together with the pattern based user interface within one display.

36 Claims, 7 Drawing Sheets

| Sel | Field Name | Field Content | | | Valuation | Field Content |
|---|---|---|---|---|---|---|
| ☐ | STREET | Weimarerweg | | | = | Weimarerweg |
| ▼ | HOUSE_NUM1 | 2 | | | ≠ | 3 |
| ☐ | POST_CODE1 | 80330 | | | = | 80330 |
| ☐ | CITY1 | Munich | | | = | Munich |
| ☐ | COUNTRY | DE | | | ≠ | DE |
| ☐ | REGION | 08 | | | = | 02 |
| ☐ | STANDARD | X | | | = | X |

Compare and Merge

Duplicate: Franz Meier — Target Object: Fritz Meier

Buttons: Copy to Target | Reset Data | Show All | Show Differences | Close Windows
(16a, 16b, 16c, 16d, 16e)

Page 1 of 1 — Filter on

NON-PATTERN BASED USER INTERFACE IN PATTERN BASED ENVIRONMENT

BACKGROUND OF THE INVENTION

I. Field of the Invention

The present invention generally relates to computer-implemented methods and systems for providing user interfaces. More particularly, the invention relates to methods and systems for providing an application for displaying data and/or interrogating user input within a pattern based user interface. The invention further relates to user interfaces on a computer for displaying data and/or interrogating user input within a pattern based user interface.

II. Background Information

In some software applications, such as Master Data Management (MDM) and other SAP software applications, data may be accessed using graphical user interfaces (UI). One possible user interface is a People Centric User Interface (PCUI), which may be a pattern based user interface (PBUI). Within pattern based user interfaces, different patterns may be defined. These patterns may define the arrangement of pattern components, such as search group containers, field group containers, toolbar group containers, tabstrip containers, or any other container. The containers may comprise fields to display data or buttons or menus in a defined manner. Further, pattern based user interfaces may define allowed combinations of user interface components on different hierarchy levels within an application. By that, it may be possible to define the positioning and sizing details for user interface components. The design and positioning object identification components and object editing components may be defined for objects in general.

Different patterns may be combined to build a floor plan. The floor plan may define the positioning of different patterns within a user interface. Using a floor plan, different applications may present their underlying data within a user interface, which may have the same look-and-feel according to the patterns. Different applications and functions with different types of data may use one floor plan. The floor plan may define where data is displayed and how data may be manipulated, even if the type of data may be different. The different data may, for example, be account management data, acquisition data, sales data, product data, analytics data, or any other business or non-business related data.

A pattern based user interface may provide a general structure of positioning and sizing of components within a display.

A pattern based user interface may be intuitive and easy to learn, as it may utilize the same patterns for navigation and layout on any screen within an application, as well as within different applications. Development of new screens of sub-applications within an application may become easier, as the pre-defined elements and patterns of the floor plan of the pattern based user interface may be used by the developers for new screens.

A pattern based user interface may be divided into different frames or windows. Each frame or window may represent one particular piece of information. Within each frame, one particular pattern may be used. The arrangement of the frames or windows may obey the floor plan of the PBUI. The look-and-feel of the frames and windows, however, may be always the same, as the same pattern may be used, independently of the application or sub-application.

The use of a pattern based user interface may have several advantages, including increased usability, simplicity, and uniformity across multiple applications, as well as within one single application. A user might not need to learn the navigation of a new user interface with each application.

However, a pattern based user interface may as well be rigid and inflexible, with respect to positioning of objects, thus limiting not only the user's choice and the programmers' ability to develop new functionality within the context of available patterns of a pattern based user interface. In general, a pattern based user interface does not permit freestyle programming, such that it may be impossible to design a frame or window according to actual needs. It is not possible to use programming languages, such as hypertext markup language (HTML) or any other programming language, allowing positioning of objects freely within a frame. The use of patterns limits the user's choices. This may reduce the frequency and types of user-introduced data errors made when the user selects by mistake the wrong option or functionality or enters the wrong data without a noticing the mistake.

SUMMARY OF THE INVENTION

Embodiments consistent with the invention overcome the above-mentioned problems and/or others by displaying data and/or interrogating user input within a pattern based user interface, and providing within the application a non-pattern based user interface at least for displaying data.

In accordance with one embodiment, by incorporating non-pattern based (NPB) frames or windows within a pattern based user interface, limitations presented within a pattern based user interface may be overcome. Freestyle programming of the design of frames may, for example, be possible, and any data or data format may be displayed within a non-pattern based user interface. Non-pattern based user interfaces, such as frames or windows, within the application, may have the advantage of added flexibility within a pattern based user interface environment, which as such may be inflexible.

Programming, presentation and functionality may be improved due to non-pattern based interfaces, and also the frequency and types of user-introduced data errors may be reduced by the use of pattern based user interfaces, consistent with embodiments of the invention. The combination of pattern based user interfaces and non-pattern based user interfaces introduces flexibility in combination with usability. If required, it may, for example, also be possible to provide the illusion of continuity of patterns available in the pattern based user interface within the non-pattern based user interface. This may be achieved by programming the non-pattern based user interface to look like the pattern based user interface. The above-mentioned advantages may be propagated without the loss of increased flexibility.

Consistent with another embodiment of the invention, a computer-implemented method may be provided for displaying business object data of at least two business objects within the non-pattern based user interface.

Business objects may comprise information about any piece of business related objects. Business objects may be, for example, data objects, which may relate to various areas within a company. This may, for example, be client data, factory structures, machine structures, production sequences, lists of materials, lists of staff, and many other data. The contents of the data objects may reproduce the current state of the particular company structure. Maintenance and operation of the company may be assisted by the use of enterprise resource planning software, such as SAP R/3. Displaying data of data objects might require flexibility in terms of positioning of data. Moreover, it may be advantageous to present the data of business data objects within non-pattern based user interfaces, as well as within patterns of a pattern based user interface within one display.

For example, according to another embodiment, the use of non-pattern based user interfaces may permit a user to perform a side-by-side (SBS) comparison of business objects. Previously, business objects may have been compared according to available patterns in a pattern based user interface in an above-below (A-B) tree format. The above-below tree format, however, is considered to be inconvenient for comparing data. The side-by-side comparison allows displaying data on either side of a frame. This may allow a more natural way to perform comparison for most users. The comparison using a side-by-side format, may allow positioning data in one single row within different columns, insofar allowing improved comparison. For example, the rest of the frame may be designed according to the pattern based user interface, with which the user may be already familiar, and hence the non-pattern based user interface may give the illusion of a seamless continuity of the established patterns.

According to still another embodiment of the invention, general information of business objects may be provided within a pattern based user interface, and detailed information of the business objects may be provided within a non-pattern based user interface. As a result, a user may, for example, select within patterns of the pattern based user interface business objects and may as well compare detail data of these business objects within the non-pattern based user interface. For example, such a comparison may be done using a SBS mode.

According to another embodiment of the invention, markup-language style sheets may be provided within the non-pattern based interface. Markup-language style sheets may allow flexible design of the non-pattern based user interface. Markup-language style sheets may, for instance, be hypertext markup-language (HTML), extensible markup-language (XML), or any other design language, which may allow device independent design.

To provide a common look-and-feel throughout an entire application, embodiments consistent with the invention may provide the pattern based user interface for all windows within an application. Patterns may be designed building a floor plan of the PBUI. This floor plan may define which pattern is displayed where on a display. The data may be displayed within the patterns in a defined style. The type of data may be different. Also, different applications or sub-applications may use the same patterns of the PBUI to display their data. For example, the entire hierarchy of an application, e.g., various windows within different hierarchical levels of sub-applications, may look alike, insofar providing easy navigation and easy use of the application for users.

Pattern based user interfaces may, consistent with embodiments of the invention, define combinations of user interface components within the user interface. The definition may concern positioning, size, relative positioning or any other appearance related issues. The user interface components may, for example, constitute a search group, a field group, a toolbar group, a tabstrip group, or any other grouping of components for selecting, editing and browsing data.

In accordance with another embodiment of the invention, the relative and/or absolute position of user interface components may be defined within the patterns of the pattern based user interface. To provide flexibility in terms of displaying various data, text, file directories, graphics, and/or multimedia content may be displayed within the non-pattern based user interface. Any other data format may as well be supported. As the non-pattern based user interface allows adjusting the position and size of displaying data within a frame or window, various different types of data may be displayed within the non-pattern based user interface.

Embodiments of the invention may also be implemented to change the appearance of the non-pattern based user interface depending on the displayed data. For example, different types of data require different positioning within the window. It may be possible, for example, to adapt the non-pattern based user interface to the data to be displayed. Accordingly, a dynamic display of data may be possible.

In accordance with another aspect of the invention, a user interface for a computer may be provided for displaying data and/or interrogating user input within a pattern based user interface, and displaying at least data within a non-pattern based user interface.

According to a further aspect of the invention, a computer program may be provided for providing a user-interface, the computer program may comprise instructions operable to cause a processor to display data and/or interrogating user input within a pattern based user interface, and display at least data within a non-pattern based user interface.

According to yet an additional aspect of the invention, a computer program product may be provided that comprises a computer program for providing a user-interface. The computer program may include instructions operable to cause a processor to display data and/or interrogating user input within a pattern based user interface, and display at least data within a non-pattern based user interface.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Figure 1:
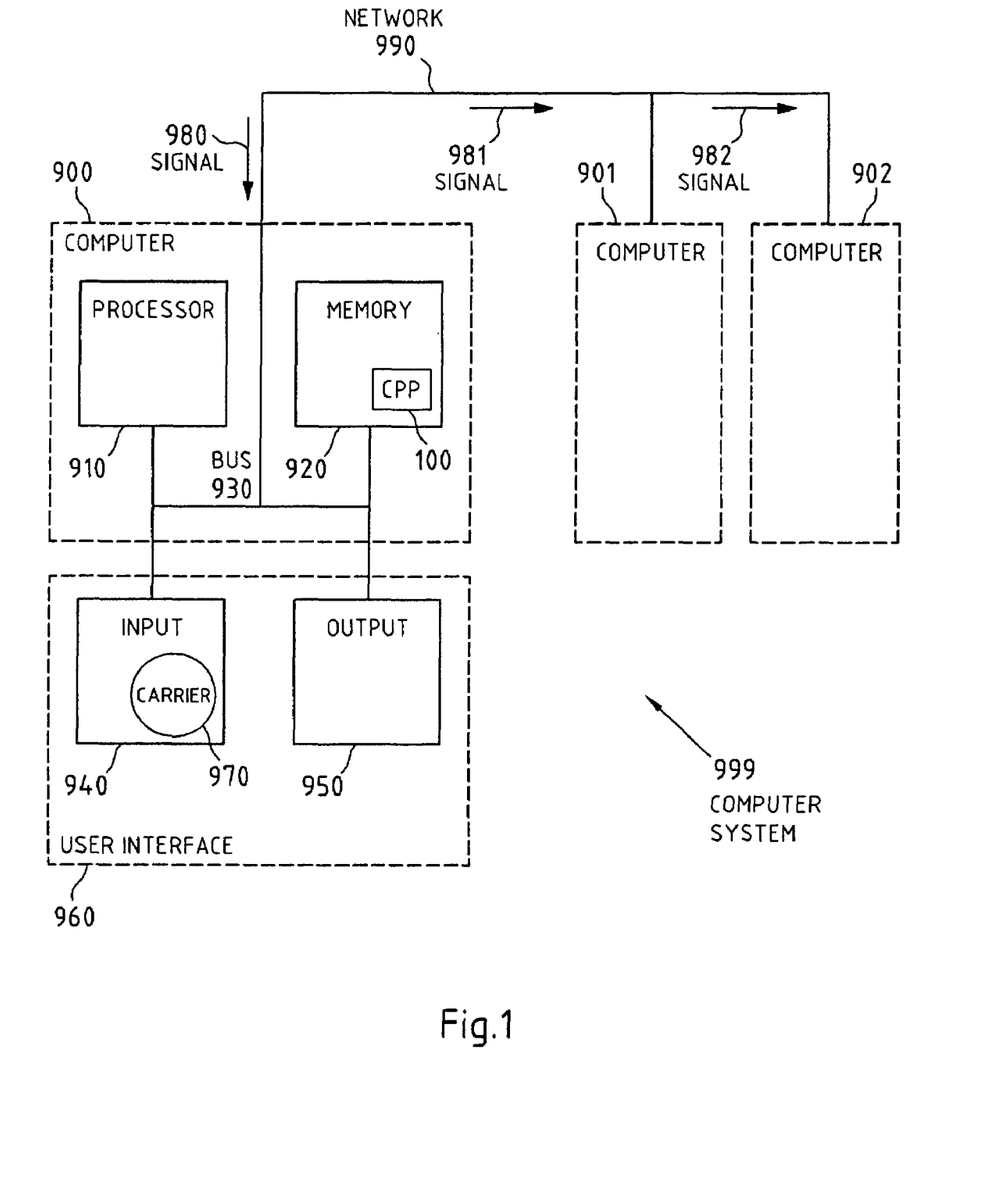
FIG. 1 illustrates an exemplary computer system for implementing embodiments of the invention.

Embodiments of the invention may be implemented within a computer system or environment. By way of example, FIG. 1 illustrates a simplified block diagram of an exemplary computer system environment 999 in which embodiments of the invention may be implemented. In the embodiment of FIG. 1, reference numbers 900, 901, 902, etc. denote similar elements, but the function of these elements can be different.

As illustrated in FIG. 1, computer system 999 may include a plurality of computers 900, 901, 902 (or even more). Computer 900 can communicate with computers 901 and 902 over network 990. Computer 900 has processor 910, memory 920, bus 930, and, optionally, input device 940 and output device 950 (I/O devices, user interface 960). As illustrated, embodiments of the invention may be implemented by computer program product (CPP) 100, carrier 970 and/or signal 980.

With respect to computer 900, computer 901/902 may sometimes be referred to as "remote computer". Computer 901/902 may be, for example, a server, a peer device or other common network node, and typically may have many or all of the elements described relative to computer 900.

Computer 900 may be, for example, a conventional personal computer (PC), a desktop device or a hand-held device, a multiprocessor computer, a pen computer, a microprocessor-based or programmable consumer electronics device, a minicomputer, a mainframe computer, a personal mobile computing device, a mobile phone, a portable or stationary personal computer, a palmtop computer or the like.

Processor 910 may be, for example, a central processing unit (CPU), a micro-controller unit (MCU), digital signal processor (DSP), or the like.

Memory 920 may comprise one or more elements that temporarily or permanently store data and instructions. Although memory 920 is illustrated as part of computer 900, memory can also be implemented in network 990, in computers 901/902 and in processor 910 itself (e.g., cache, register), or elsewhere. Memory 920 can be a read only memory (ROM), a random access memory (RAM), or a memory with other access options. Memory 920 may be physically implemented by computer-readable media, for example: (a) magnetic media, like a hard disk, a floppy disk, or other magnetic disk, a tape, a cassette tape; (b) optical media, like optical disk (CD-ROM, digital versatile disk—DVD); (c) semiconductor media, like DRAM, SRAM, EPROM, EEPROM, or a memory stick.

Optionally, memory 920 is distributed. Portions of memory 920 can be removable or non-removable. For reading from media and for writing in media, computer 900 may use well-known devices, for example, disk drives, or tape drives.

Memory 920 may comprise one or more modules such as, for example, a basic input output system (BIOS), an operating system (OS), a program library, a compiler, an interpreter, and a text-processing tool. Modules are commercially available and can be installed on computer 900. For simplicity, these modules are not illustrated in FIG. 1.

CPP 100 comprises program instructions and, optionally, data that cause processor 910 to execute method steps, consistent with embodiments of the present invention. In other words, CPP 100 can control the operation of computer 900 and its interaction in network system 999 so that is operates to perform methods consistent with embodiments of the invention. For example and without the intention to be limiting, CPP 100 can be available as source code in any programming language, and as object code ("binary code") in a compiled form.

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 may be conveniently inserted into input device 940. Carrier 970 may be implemented as any computer readable medium, such as a medium largely explained above (cf. memory 920). In one embodiment, carrier 970 is an article of manufacture having a computer readable medium with computer readable program code to cause the computer to perform methods consistent with embodiments of the present invention. Further, signal 980 can also embody computer program product 100.

Having described CPP 100, carrier 970, and signal 980 in connection with computer 900 is convenient. Optionally, further carriers and further signals may embody computer program products (CPP) to be executed by further processors in computers 901 and 902.

Input device 940 provides data and instructions for processing by computer 900. Device 940 can be a keyboard, a pointing device (e.g., mouse, trackball, cursor direction keys), microphone, joystick, game pad, scanner, or disc drive. Although the examples are devices with human interaction, device 940 can also be a device without human interaction, for example, a wireless receiver (e.g., with satellite dish or terrestrial antenna), a sensor (e.g., a thermometer), or a counter (e.g., a goods counter in a factory). Input device 940 can also serve to read carrier 970.

Output device 950 presents instructions and data that have been processed. For example, this can be a monitor or a display (e.g., cathode ray tube (CRT), flat panel display, liquid crystal display (LCD), speaker, printer, plotter, or vibration alert device. Output device 950 can communicate with the user, but it can also communicate with further computers.

Input device 940 and output device 950 can be combined to a single device. Additionally, or alternatively, any device 940 and 950 can be made optional.

Bus 930 and network 990 provide logical and physical connections by conveying instruction and data signals. While connections inside computer 900 are conveniently referred to as "bus 930", connections between computers 900-902 are referred to as "network 990". Optionally, network 990 includes gateways that comprise computers that specialize in data transmission and protocol conversion.

Devices 940 and 950 are coupled to computer 900 by bus 930 (as illustrated) or by network 990 (optional). While the signals inside computer 900 are mostly electrical signals, the signals in network are electrical, electromagnetic, optical or wireless (radio) signals.

Networks are commonplace in offices, enterprise-wide computer networks, intranets and the Internet (e.g., the world wide web—WWW). Network 990 can be a wired or a wireless network. To name a few network implementations, network 990 can be, for example, a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

A variety of transmission protocols, data formats and conventions is known, for example, as transmission control protocol/internet protocol (TCP/IP), hypertext transfer protocol (HTTP), secure HTTP, wireless application protocol (WAP), unique resource locator (URL), a unique resource identifier (URI), hypertext markup language (HTML), extensible markup language (XML), extensible hypertext markup language (XHTML), wireless markup language (WML), and Standard Generalized Markup Language (SGML).

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computers and programs are closely related. As used hereinafter, phrases, such as "the computer provides" and "the program provides", are convenient abbreviation to express actions by a computer that is controlled by a program.

In known systems, such as R/3 of SAP, user interfaces may be provided that are completely non-pattern based. These non-pattern based user interfaces may permit completely freestyle programming. The programmers of these non-pattern based user interfaces may have significant flexibility to program and design whatever they want within the user interface. Because programmers often use their freedom to program, the user is faced with the problem of using different user interfaces across different applications, even within one application. The different interfaces have the drawback of reduced usability, simplicity, and uniformity. Different user interfaces may also introduce an increasing possibility of user introduced data errors. In addition, while non-pattern based user interfaces already include side-by-side comparison functionality, this functionality is available at the expense of definable patterns to guide the user through the application.

Figure 2:
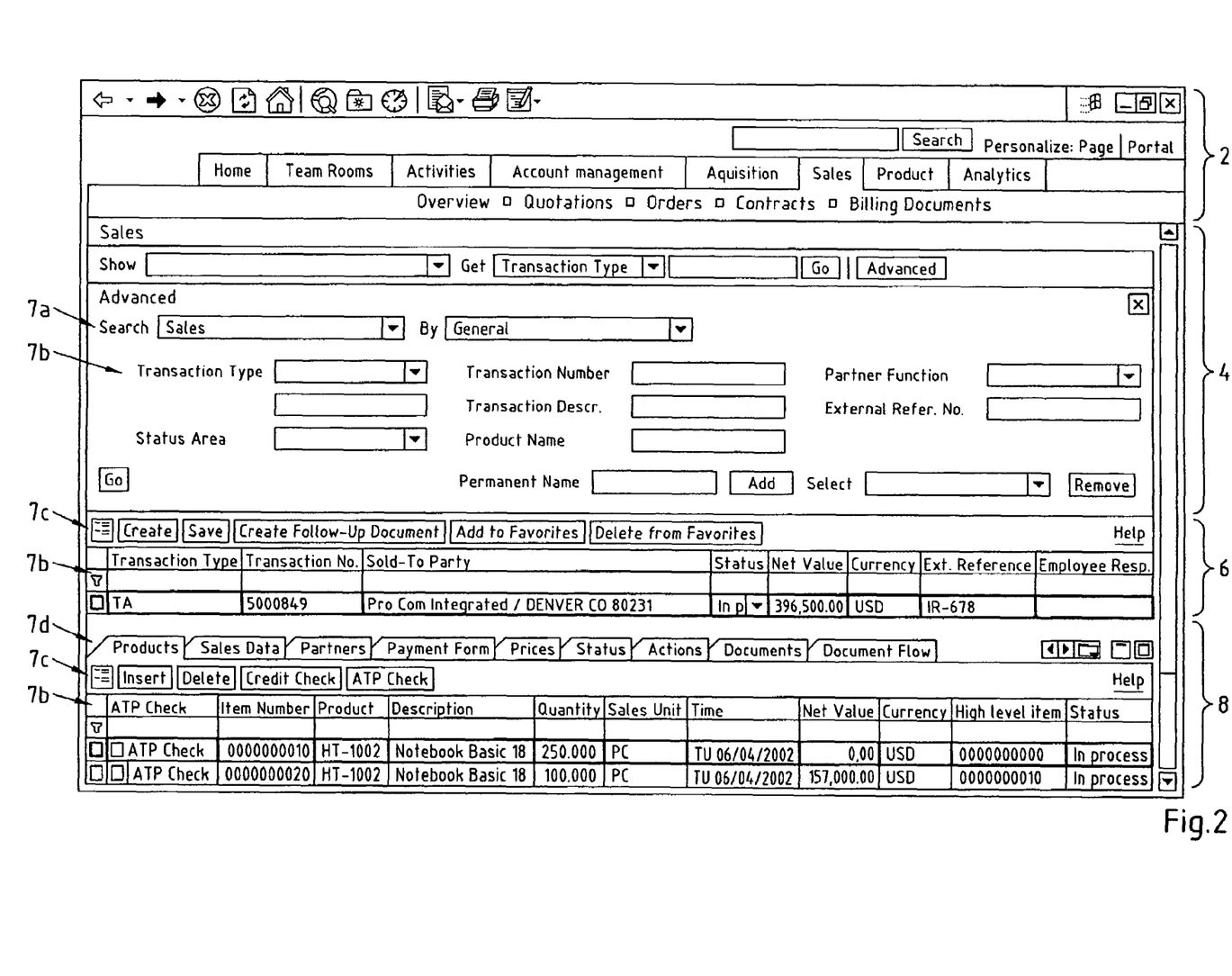
FIG. 2 is an exemplary screen-shot of a pattern based user interface with four different pattern based frames, consistent with an embodiment of the invention.

FIG. 2 shows an exemplary user interface, consistent with an embodiment of the invention. In FIG. 2, the user interface includes four different patterns 2, 4, 6, and 8 within a frame, with each of the patterns displaying data within the pattern based user interface. The arrangement of the patterns 2-8 within the shown frame may obey a floor plan. The floor plan may define, for example, where and how the different patterns 2-8 are arranged within the frame.

A first pattern 2 may be a pattern for user orientation. Different tabs may be provided to allow the user to browse within different areas or sub-applications within the application. These areas may, for instance, be home, team rooms, activities, account management, acquisition, sales, product, or analytics. Within pattern 2, a search area may also be provided. Consistent with an embodiment of the invention, the first pattern 2 may provide the same design throughout all windows and sub-applications within the application.

A second pattern 4 may provide information about object search and selection options, as well as object identification data. For each of the different tabs home, team rooms, activities, account management, acquisition, sales, product, or analytics within the first frame 2, representing different applications, the appearance of the second pattern 4 may be the same. The look-and-feel in the second pattern 4 may be the same for all sub-applications and windows of the respective application.

In addition, a third pattern 6, providing the possibility to edit main attributes of data objects may be provided. Within the third pattern 6, the position and arrangement of tables and tabs, as well as check boxes and buttons, may be defined. To this extent, for each sub-application the same appearance may be provided.

In a forth pattern 8, editing details of main attributes of selected data objects may be presented in a pattern based manner. Consistent with an embodiment of the invention, for each object, the design of the forth pattern 8 may always be the same. This may allow the user easy navigation between different data objects.

The patterns may be designed using pattern components. These may be groups of components. For example, the groups search group 7a, field group 7b, toolbar group 7c, and tabstrip group 7d may be provided. Within each group, respective components may be available, providing means to browse, manipulate and display data of various applications or sub-applications.

Figure 3:
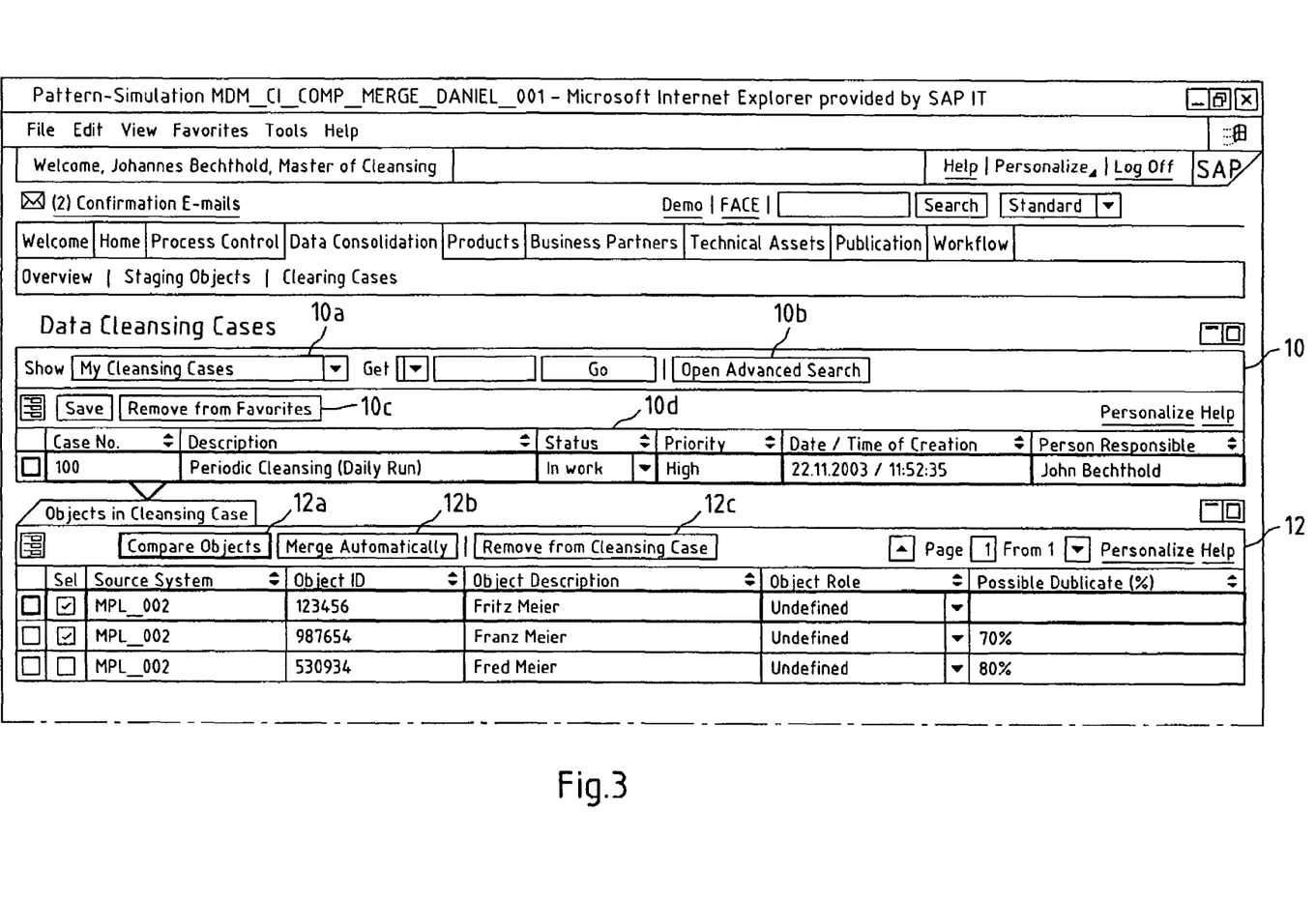
FIG. 3 is an exemplary screen-shot of a pattern based user interface with object identification pattern frames, consistent with an embodiment of the invention.

FIG. 3 illustrates an exemplary screen shot of a user interface, consistent with an embodiment of the invention. In FIG. 3, the screen shot relates to an exemplary application providing two patterns 10, 12, which provide a pattern based user interface, consistent with the invention. The first pattern 10 may be an object identification pattern. This first pattern 10 of the pattern based user interface may be defined as an object identification pattern.

For instance, in an application allowing cleansing of data, in particular duplicates of data, which application will be described in the following, this pattern 10 may display the cleansing cases which are available for processing. The user may select a single cleansing case for processing. The object identification pattern 10 may display the most important attributes of a particular cleansing case, for example, case number, description, priority, and other attributes.

A pull-down menu 10a may provide different default queries for displaying cleansing cases. These may for instance be show "my cleansing cases" and show "my cleansing cases for today". The first query may display all cleansing cases which may be assigned to a current user, whereas the latter query may display all cleansing cases assigned to the current user which are to be processed on the current date.

An advanced search button 10b may provide the user with the possibility to search for cleansing cases by attributes, for example, by user, priority, description, or by objects that are contained in a cleansing case, for example, display cleansing cases for a specific business partner.

A toolbar and container row 10c may be provided that comprises various buttons. For example, these buttons may be a safe button, allowing the user to safe a currently processed cleansing case and its objects in a specified status. A delete button (not depicted) may allow the user to delete outdated cleansing cases from his work list. The delete button may only be active if the user has selected an outdated cleansing case.

A check matching score button (not depicted) may also be provided, which may only be active if the cleansing case contains an object that has changed since the cleansing case was created. In such a case, the user may select the check matching score button to trigger an online duplicate check.

A cleansing case status pull-down menu 10d may also be provided, displaying the cleansing case status of the current object. The status may be one of the following:

new, in case the cleansing case and its objects have not yet been processed, in work, in case the cleansing case and its objects are in work status, rejected, in case the objects in the cleansing case do not match at all, release, in case the objects in the cleansing case match, and outdated, in case a new cleansing case was created for the referenced object in the current cleansing case.

As further shown in FIG. 3, a second pattern 12 may provide data as an object data pattern 12. The object data pattern 12 may allow users to see all available objects, for example, business partner records, or other data, which are contained in a respective cleansing case selected within pattern 10. This pattern 12 may display in a pattern based manner the important attributes of the individual objects. A user may select any two objects for a comparison by marking the check boxes next to the desired objects. The pattern 12 may be used according to embodiments of the invention for any kind of data selected within pattern 10. The pattern 12 may also be used for any kind of application. The floor plan of the pattern based user interface may define that pattern 12 allows displaying information about data selected in pattern 10. Further, different applications may appear similarly, as the same patterns are used according to the floor plan in different applications, or sub-applications for different types of data.

In the pattern 12, different toolbar functions may be available in a pattern based manner, thereby providing the buttons within all applications at the same position. The functions may be provided by a compare objects button 12a, which allows comparing selected objects, and a merge automatically button 12b, which allows merging objects automatically according to defined rules. A remove from cleansing case button 12c allows removing these objects form the cleansing case.

The embodiment of FIG. 3 shows a pattern based user interface, providing a user with the same look-and-feel throughout all sub-applications or windows by providing the same patterns 10, 12 according to a floor plan. After having selected a cleansing case in pattern 10, and having selected objects, which are to be compared in pattern 12, a user may click the compare objects button 12a providing a non-pattern based frame 14, such as that depicted in FIG. 4.

Figure 4:
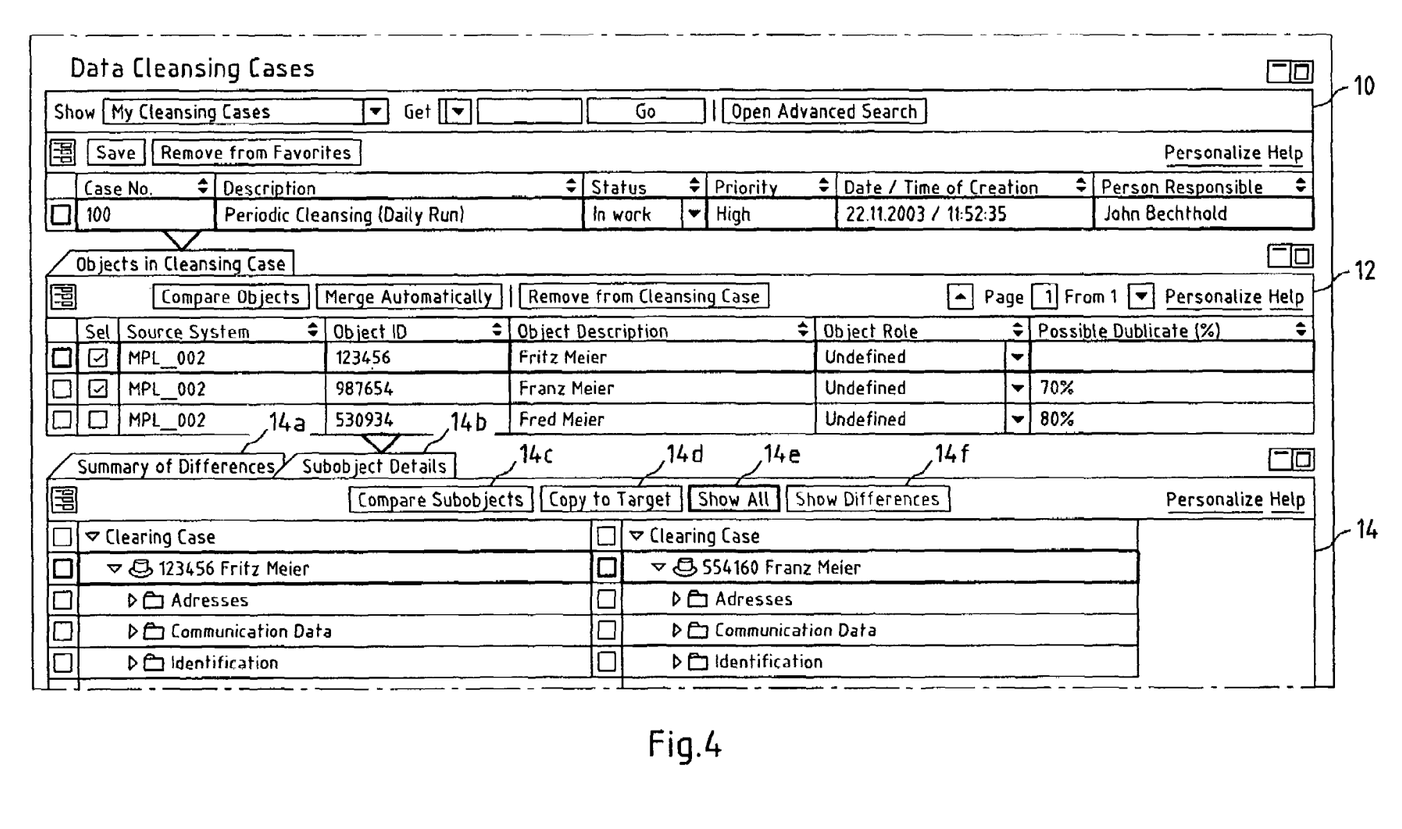
FIG. 4 is an exemplary screen-shot of a pattern based user interface in combination with a non pattern based user interface, consistent with an embodiment of the invention.

FIG. 4 depicts an exemplary screen-shot, consistent with an embodiment of the invention, with the patterns 10, 12 of the pattern based user interface in combination with a non-pattern based frame 14. This non-pattern based frame 14 may be provided to allow comparing objects. The non-pattern based frame 14 may provide detail information about objects that were selected within pattern 12. A user may compare the sub-object attributes of two selected business objects and merge these sub-object attributes.

The non-pattern based user interface, frame or window may be distinguished by allowing placing objects at any place within the window. The design is freely programmable. No constraints due to a pattern of a pattern based user interface needs to be obeyed. The non-pattern based user interface may be a new window of an application, which is not restricted to patterns of the pattern based user interface of the application.

In the embodiment of FIG. 4, by clicking on a Summary of Differences tab 14a, a user may see an overview over all sub objects which may be different between two objects which were selected for comparison. Further, the user may quickly see where sub-object comparison needs to be carried out.

Additionally, by clicking a Subobjects Details tab 14b, as depicted, the contents of the sub-objects, for example, the address of a business partner, for two selected objects may be displayed. These sub-object details for each select object may be displayed as adjacent trees in a side-by-side manner. Insofar, a table may be provided with two columns, each column comprising one of the data objects to be compared. The rows of the table may comprise the respective attributes of the objects.

Non-pattern based user interface 14 may also provide in a non-pattern based manner toolbar buttons, which may be a Compare Subobjects button 14c, which allow comparing to sub objects selected in the table and displaying the details on attribute level in a pop-up window. A Copy to Target button 14d may be provided. This button 14d may allow copying a selected sub-object to a target sub-object. A Show All button 14e may also be provided, allowing showing all sub objects of selected objects. In addition, a Show Differences button 14f may be provided, allowing displaying those attributes that contain differences.

Figure 5:
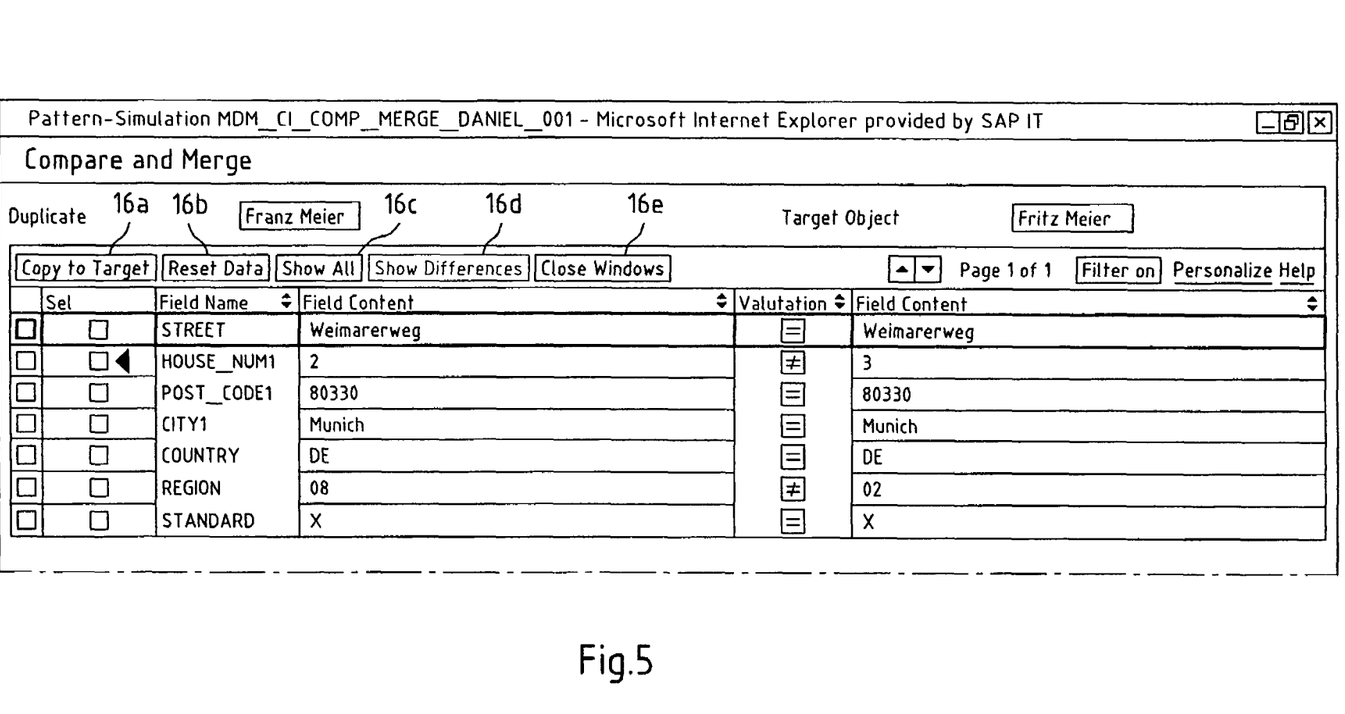
FIG. 5 is an exemplary screen-shot of a non-pattern based pop-up window for displaying business object data, consistent with an embodiment of the invention.

After having selected one attribute of the objects, and having depressed the Compare Subobjects button 14c, a compare and merge pop-up window, as depicted in FIG. 5, may be displayed. This window may be a non-pattern based window, showing the details of the selected sub-objects on attribute level within one table view. The user may compare two selected objects and may merge data at attribute level, if necessary, by copying attributes from one column to the other.

Different functionality may be provided through buttons 16, which may include a Copy to Target button 16a. This Copy to Target button 16a, may allow copying the selected sub-object to a target object. In addition, a Reset Data button 16b may allow resetting changed data. A Show All button 16c may allow showing all attributes of a sub-object, irrespective of any differences. A Show Differences button 16d may allow showing all differences of attributes. Further, a Close Window button 16e may cause closing the window shown in FIG. 5.

Figure 6:
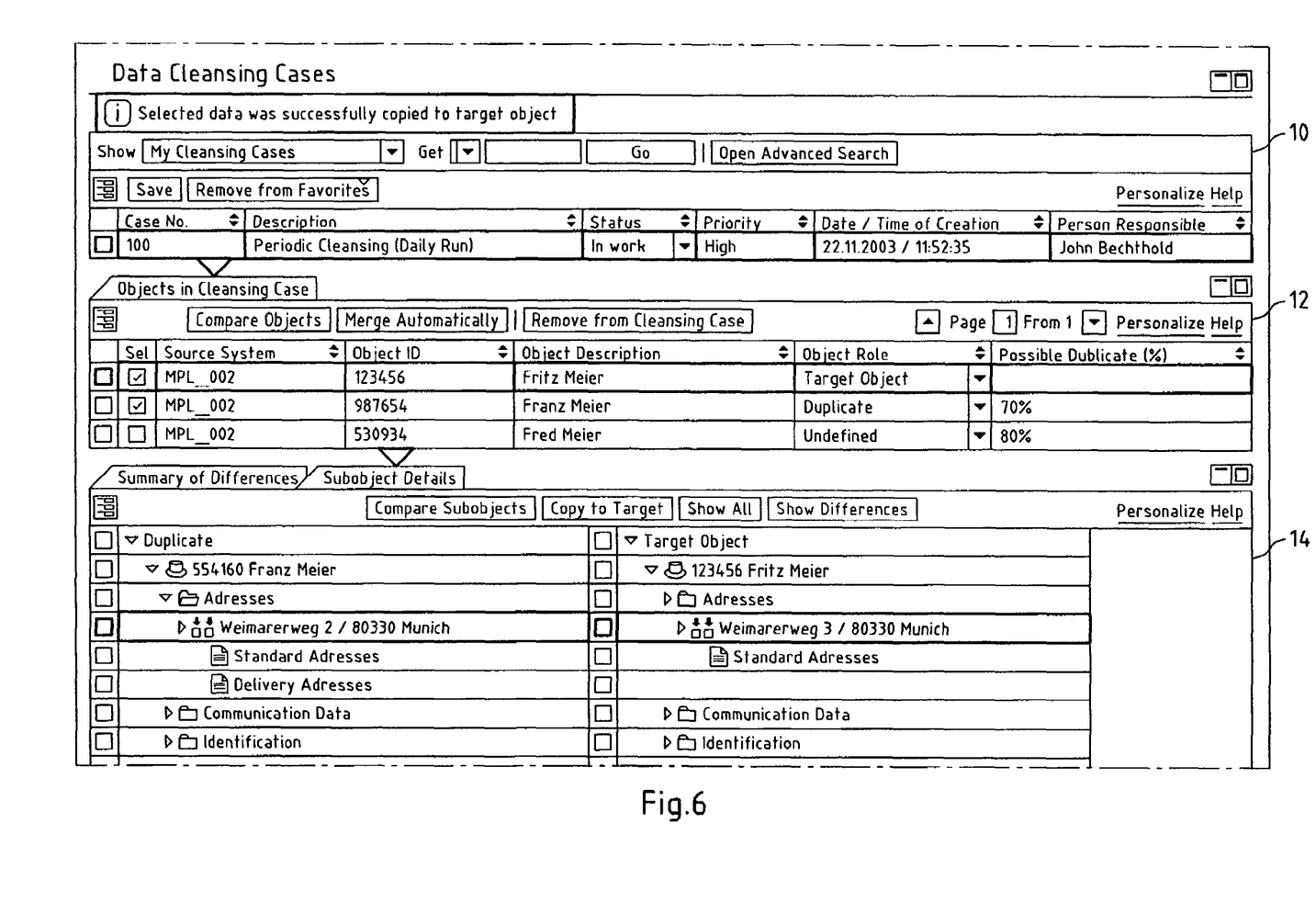
FIG. 6 is a further exemplary screen-shot of a user interface, consistent with an embodiment of the invention.

FIG. 6 illustrates another exemplary screen-shot of a user interface, consistent with an embodiment of the invention. In FIG. 6, two sub-objects of a cleansing project shown in pattern 10 and selected in pattern 12 have been compared in non-pattern based user interface 14. Data has been merged between these objects. After the data has been copied to the target object, a result message may be displayed in pattern 10, informing the user about the result of the cleansing process.

Figure 7:
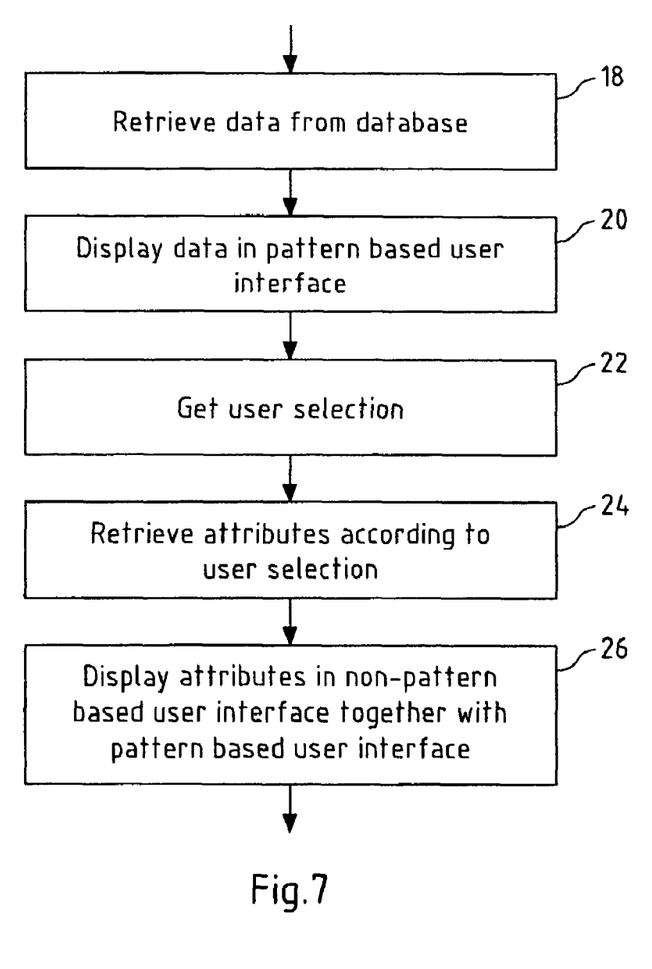
FIG. 7 a flowchart of an exemplary method, consistent with an embodiment of the invention.

Consistent with another embodiment of the invention, FIG. 7 illustrates a flow chart of an exemplary method. As illustrated in the embodiment of FIG. 7, to display data, data is retrieved from a database or memory (step 18). After data has been read from the database, it is displayed within pattern(s) of a pattern based user interface (step 20). A user may select data objects within the pattern based user interface, and the user selection may be retrieved (step 22). According to the retrieved user selection, attributes of the respective data objects may be retrieved (step 24). The retrieved attributes may then be displayed in a non-pattern user interface together with the pattern based user interface (step 26).

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects, can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

LIST OF REFERENCE NUMBERS 2-12 patterns
10a pull-down menu
10b advanced search button
10c toolbar and container row
10d pull-down menu
12a compare objects button
12b merge automatically button
12c remove from cleansing case button
14 non-pattern based user interface
14a Summary of Differences tab
14b Subobjects Details tab
14c Compare Subobjects button
14d Copy to Target button
14e Show All button
14f Show Differences button
16a Copy to Target button
16b Reset Data button
16c Show All button
16d Show Differences button
16e Close Window button
18 retrieve data from database
20 display data in pattern based user interface
22 get user selection
24 retrieve user selection
26 display attributes in non-pattern base user interface
100 computer program product
900 computer
910 processor
920 memory
930 bus
940 input device
950 output device
960 user interface
970 program carrier
980 program signal
990 computer network
999 computer network system

What is claimed:

1. A computer-implemented method for providing a user-interface, the method comprising:
displaying, using a processor, a pattern based user interface within a window, the pattern based user interface including information of a plurality of data objects, the pattern based user interface being developed by reusing predefined user interface components;
receiving a first input from a user via the pattern based user interface, the first input comprising a selection of one of the plurality of data objects displayed in the pattern based user interface;
displaying, in response to the first input, a non-pattern based user interface within the window, the non-pattern based user interface including sub-object attribute data of the selected data object and information of the selected data object, the non-pattern based user interface being developed by editing a source code of the non-pattern based user interface; and
receiving, in the non-pattern based user interface, a second input from the user to change a position of at least one element of the sub-object attribute data displayed in the non-pattern based user interface, wherein the pattern based user interface and the non-pattern based user interface are displayed together in the window.

2. The computer-implemented method of claim 1, further comprising displaying business sub-object attribute data of at least two business objects within the non-pattern based user interface.

3. The computer-implemented method of claim 1, further comprising displaying business sub-object attribute data of at least two business objects on a side-by-side basis within the non-pattern based user interface.

4. The computer-implemented method of claim 1, further comprising providing the non-pattern based user interface within at least one frame separated from the pattern based user interface.

5. The computer-implemented method of claim 1, further comprising providing general information of business objects within the pattern based user interface and providing detail information of the business objects within the non-pattern based user interface.

6. The computer-implemented method of claim 1, further comprising providing markup-language style sheets for developing the non-pattern based user interface.

7. The computer-implemented method of claim 1, further comprising displaying a plurality of frames including pattern based user interfaces.

8. The computer-implemented method of claim 1, wherein the pattern based user interface is defined on different hierarchy levels.

9. The computer-implemented method of claim 1, further comprising defining combinations of the predefined user interface components within the pattern based user interface.

10. The computer-implemented method of claim 9, further comprising defining relative positions or absolute positions of the predefined user interface components within the pattern based user interface.

11. The computer-implemented method of claim 1, further comprising providing at least one of text, file directories, graphics, and multimedia content within the non-pattern based user interface.

12. The computer-implemented method of claim 1, further comprising changing the appearance of the non-pattern based user interface based on the displayed data.

13. A device for displaying a user-interface on a computer, comprising:
means for displaying, using a processor, a pattern based user interface within a window, the pattern based user interface including information of a plurality of data objects, the pattern based user interface being developed by reusing predefined user interface components;
means for receiving a first input from a user via the pattern based user interface, the first input comprising a selection of one of the plurality of data objects displayed in the pattern based user interface;
means for displaying, in response to the first input, a non-pattern based user interface within the window, the non-pattern based user interface including sub-object attribute data of the selected data object and information of the selected data object, the non-pattern based user interface being developed by editing a source code of the non-pattern based user interface; and
means for receiving, in the non-pattern based user interface, a second input from the user to change a position of at least one element of the sub-object attribute data displayed in the non-pattern based user interface, wherein the pattern based user interface and the non-pattern based user interface are displayed together in the window.

14. The device of claim 13, further comprising means for displaying business sub-object attribute data of at least two business objects within the non-pattern based user interface.

15. The device of claim 13, further comprising means for displaying business sub-object attribute data of at least two business objects on a side-by-side basis within the non-pattern based user interface.

16. The device of claim 13, further comprising means for providing the non-pattern based user interface within at least one frame separated from the pattern based user interface.

17. The device of claim 13, further comprising means for providing general information of business objects within the pattern based user interface and providing detail information of the business objects within the non-pattern based user interface.

18. The device of claim 13, further comprising means for providing markup-language style sheets for developing the non-pattern based user interface.

19. The device of claim 13, further comprising means for displaying a plurality of frames including pattern based user interfaces.

20. The device of claim 13, wherein the pattern based user interface is defined on different hierarchy levels.

21. The device of claim 13, further comprising means for defining combinations of the predefined user interface components within the pattern based user interface.

22. The device of claim 21, wherein relative positions or absolute positions of the predefined user interface components are defined within the pattern based user interface.

23. The device of claim 13, further comprising means for providing at least one of text, file directories, graphics, and multimedia content within the non-pattern based user interface.

24. The device of claim 13, further comprising means for changing the appearance of the non-pattern based user interface based on the displayed data.

25. A computer program product tangibly embodied in a computer-readable storage medium, comprising instructions operable to cause a computer to perform a method comprising:

displaying, using a processor, a pattern based user interface within a window, the pattern based user interface including information of a plurality of data objects, the pattern based user interface being developed by reusing predefined user interface components;

receiving a first input from a user via the pattern based user interface, the first input comprising a selection of one of the plurality of data objects displayed in the pattern based user interface;

displaying, in response to the first input, a non-pattern based user interface within the window, the non-pattern based user interface including sub-object attribute data of the selected data object and information of the selected data object, the non-pattern based user interface being developed by editing a source code of the non-pattern based user interface; and receiving, in the non-pattern based user interface, a second input from the user to change a position of at least one element of the sub-object attribute data displayed in the non-pattern based user interface, wherein the pattern based user interface and the non-pattern based user interface are displayed together in the window.

26. The computer program product of claim 25, further comprising instructions operable to cause the computer to display business sub-object attribute data of at least two business objects within the non-pattern based user interface.

27. The computer program product of claim 25, further comprising instructions operable to cause the computer to display business sub-object attribute data of at least two business objects on a side-by-side basis within the non-pattern based user interface.

28. The computer program product of claim 25, further comprising instructions operable to cause the computer to provide the non-pattern based user interface within at least one frame separated from the pattern based user interface.

29. The computer program product of claim 25, further comprising instructions operable to cause the computer to provide general information of business objects within the pattern based user interface and provide detail information of the business objects within the non-pattern based user interface.

30. The computer program product of claim 25, wherein the non-pattern based user interface was developed using markup-language style sheets.

31. The computer program product of claim 25, further comprising instructions operable to cause the computer to display a plurality of frames including pattern based user interfaces.

32. The computer program product of claim 25, wherein the pattern based user interface is defined on different hierarchy levels.

33. The computer program product of claim 25, wherein combinations of the predefined user interface components are defined within the pattern based user interface.

34. The computer program product of claim 25, wherein relative positions or absolute positions of the predefined user interface components are defined within the pattern based user interface.

35. The computer program product of claim 25, further comprising instructions operable to cause the computer to provide at least one of text, file directories, graphics, and multimedia content within the non-pattern based user interface.

36. The computer program product of claim 25, further comprising instructions operable to cause the computer to change the appearance of the non-pattern based user interface based on the displayed data.

* * * * *